United States Patent [19]

Becker et al.

[11] Patent Number: 5,779,915

[45] Date of Patent: Jul. 14, 1998

[54] METHOD OF REMOVING CHLORINE AND HALOGEN-OXYGEN COMPOUNDS FROM WATER BY CATALYTIC REDUCTION

[75] Inventors: Arne Becker, Hanover; Michael Sell, Peine; Gerhard Neuenfeldt, Estorf; Veronika Koch, Gehrden; Hubert Schindler, Uetze, all of Germany

[73] Assignee: Solvay Umweltchemie GmbH, Hanover, Germany

[21] Appl. No.: 809,047

[22] PCT Filed: Sep. 5, 1995

[86] PCT No.: PCT/EP95/03481

§ 371 Date: Mar. 7, 1997

§ 102(e) Date: Mar. 7, 1997

[87] PCT Pub. No.: WO90/07617

PCT Pub. Date: Mar. 14, 1996

[30] Foreign Application Priority Data

Sep. 8, 1994 [DE] Germany ............... 44 31 790.5
Sep. 8, 1994 [DE] Germany ............... 44 31 975.4

[51] Int. Cl.$^6$ .................................................. C02F 1/70
[52] U.S. Cl. ........................................ 210/757; 210/763
[58] Field of Search ............................ 210/719, 757, 210/762, 763

[56] References Cited

U.S. PATENT DOCUMENTS

| 4,397,720 | 8/1983 | Moore et al. ............... 210/757 |
| 4,990,266 | 2/1991 | Vorlop et al. ............... 210/757 |
| 5,279,717 | 1/1994 | Okajima et al. ............ 204/98 |
| 5,392,428 | 2/1995 | Dilla et a l. ................ 210/631 |

FOREIGN PATENT DOCUMENTS

| 276044 | 7/1988 | European Pat. Off. ....... 210/757 |
| 586998 | 8/1993 | European Pat. Off. . |
| 94/20423 | 9/1994 | WIPO . |

*Primary Examiner*—Peter A. Hruskoci
*Attorney, Agent, or Firm*—Evenson, McKeown, Edwards & Lenahan

[57] ABSTRACT

The invention concerns a method of removing substances present in water, in particular halogen-oxygen compounds which remain in the water as residues of disinfecting or are formed as by-products of oxidative water treatment. According to the invention, the substances present in water are removed by catalytic reduction in the presence of hydrogen on a supported precious metal catalyst.

21 Claims, No Drawings

METHOD OF REMOVING CHLORINE AND HALOGEN-OXYGEN COMPOUNDS FROM WATER BY CATALYTIC REDUCTION

DESCRIPTION

The invention relates to a method for removing substances from water, especially compounds and by-products of oxidative treatment of water.

The known methods of water treatment are often multi-step processes wherein, for example, thermal-alkaline, oxidative, biological or adsorptive treatments can be combined in various ways.

It is known that surface waters can be used for obtaining potable water, for example by bank filtration. For hygienic reasons, and to satisfy the limits specified in the Potable Water Ordinance, the microorganisms and organic substances must be removed in particular.

Likewise, physical processes, such as membrane separation methods or filtering methods are known and are being employed.

In oxidative water treatment, e.g., by disinfection with chlorine, hypochlorite, chlorine dioxide and ozone, in the presence of oxidizable substances, by-products are also formed, e.g., halogen-oxygen compounds such as chlorine-oxygen compounds, or bromates, or halogenated hydrocarbons such as trihalogen methane, which have to be removed, so that the water can be used to supply potable water, or can be discharged as treated water, for example into a main ditch, or supplied as potable water into the production process.

In oxidative treatment, with ozone for example, a halide such as chloride or bromide, is oxidized by the following mechanism:

$$O_3 + Hal^- \rightarrow O_2 + OHal^-$$

$$2O_3 + OHal^- \rightarrow 2O_2 + HalO_3^-$$

This reaction is dependent upon pH, upon the amount of oxidant, and also upon time.

Since bromate ions have a provable carcinogenic activity, they have to be removed from the water. The World Health Organization (WHO) requires that the bromate content in potable water not exceed 25 µg/l, and a limit of 3 µg/l is anticipated for the future.

Since chlorate ions are undesirable in drinking water, they have to be removed from the water. Even in the case of disinfection with chlorine dioxide undesirable by-products are formed, which are proven to cause hemolytic anemias and thus should not be contained in potable water.

But even from waters which are not to be used as drinking water, these substances have to be removed since their oxidation potential can be undesirable in many cases.

The object of the invention is to provide a method for water treatment wherein halogen-oxygen compounds can be removed economically or their residual concentrations can be minimized. Halogen-oxygen compounds in the sense of the invention are chlorate and bromate compounds.

According to the invention these compounds are reduced with hydrogen on a supported precious metal catalyst.

The reductive decomposition of bromate takes place according to the following equation:

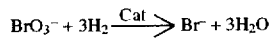

The reductive decomposition of chlorate takes place according to the following equation:

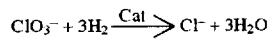

Precious metal catalysts which contain as an active metal substance, metals of the eighth subgroup of the periodic table of the elements, e.g., platinum, palladium, iridium, rhodium, preferably palladium or a combination of palladium with a metal of the copper group, preferably copper or silver, especially copper, are used as catalysts.

In a preferred embodiment of the invention, supported palladium/copper or palladium catalysts are used.

Inorganic oxides, e.g., $Al_2O_3$, preferably $\gamma$-$Al_2O_3$, $SiO_2$, $ZrO_2$, MgO or $TiO_2$, are used as support materials. Combinations of these or other support materials, such as alumosilicates, magnesium alumosilicates or active carbon, are also suitable. Preferably inorganic materials are used which are resistant to water and abrasion.

According to the invention, hydrogen gas is charged into the water to be treated, and the water charged with hydrogen is contacted with the catalyst.

In a preferred variant, a catalyst is used which contains as metal component preferably palladium and/or rhodium or palladium and a metal of the copper group, especially copper. The catalyst support material is impregnated with the metal component in a known manner.

For example, an impregnated support can be used which has an inhomogenous distribution of the metal or metals with a concentration in the surface region.

Likewise suitable are materials which have a particle diameter ranging from 10 to 5,000 µm, preferably 50 to 600 µm.

Within the scope of the present invention water and aqueous solutions of any origin can be treated if they are free of substances which act as poisons for catalysts containing palladium, rhodium or copper or which attack the support material. In the present invention, the expression "water" refers to such waters and aqueous solutions.

On the one hand the process can be used for treating water which corresponds in its purity to a water which has passed through natural filtration. Such water can contain water-soluble substances, such as inorganic salts, in orders of magnitude in which they are to be found in ground water, that is, up to a few grams per liter.

Such waters are, for example, ground water, well water, spring water, surface water or bank filtrates or already correspondingly pre-filtered waste waters, such as industrial waste water, for example from flue gas washing, but also beverages such as mineral water, soft drinks and fruit juices.

The method is thus suitable for use in potable water purification, and in the purification of water used, for example, for the food or beverage industries.

On the other hand, this method is likewise suitable to reduce halogen-oxygen compounds in heavily contaminated waste water (e.g., chlorate or bromate concentrations >3 g/l).

In accordance with the invention the hydrogen can be introduced into the water either by direct introduction of hydrogen gas or by means of suitable saturating systems, such as static mixers, bubble column reactors, or membranes. Other known methods are likewise suitable for the introduction of hydrogen.

In a preferred variant of the method, the gassing of the water with hydrogen is performed in a known manner, by gas saturators for example, whereby it is important that the hydrogen be injected in a very fine stream and without forming gas bubbles, and be uniformly distributed in the water. Permeation gassing, a known technique, has proved especially suitable. In this technique the gas is introduced into the water through a solid membrane, for example an unreinforced or fabric reinforced silicone rubber membrane, or a solid supporting membrane with a 5 to 20 µm thick silicone layer, as a composite membrane. An important characteristic of permeation gassing is the bubble-free introduction of the gas due to material transport based exclusively on diffusion and solubility processes in the nonporous membrane material. Another advantage of permeation gassing is that the introduction of the gas can be increased by simply increasing the gas partial pressure in the membrane system up to the pressure-dependent saturation limit of hydrogen in water, or by increasing the rate of flow of the water, resulting in a reduction in size of the boundary layer at the membrane/water interface. This is advantageous when large amounts of hydrogen are needed.

Hydrogen introduction can occur either simultaneously with the contact between the water and the catalyst, or separately. In a preferred variant the hydrogen introduction occurs prior to the actual catalytic reaction.

For catalytic decomposition of high halogen-oxygen ion concentrations, the hydrogen is advantageously brought into contact with the catalyst simultaneously with the water in a three-phase reactor (e.g., a sprinkled bed reactor).

It has proven advantageous to perform the treatment of the water in the presence of an amount of hydrogen that corresponds at least to the equivalent amounts of the substances that are to be removed, whereby other reducible substances that may be present also are reduced.

The method of the invention can operate at normal pressure or slightly elevated pressure, e.g., up to 10 atmospheres. The solubility of hydrogen gas in the water at normal pressure and temperatures between 10° and 25° C. is less than 2 mg/l and is doubled if the pressure is also doubled. Where the reduction of greater amounts of oxygen compounds requires correspondingly greater amounts of hydrogen, the use of three-phase reactors has been found useful.

If the gassing of the water with hydrogen and contact with the catalyst take place simultaneously, the water is brought into contact with the catalyst for a period of time that is necessary for the reduction of the substances to be removed in accordance with invention. The catalytic treatment can be performed in a solid bed, a fluidized bed or a flowing bed reactor.

The treatment can be performed either continuously or discontinuously.

In one embodiment water, which for example has already passed through an oxidative treatment, but still contains halogen-oxygen compounds as well as residual traces of ozone, for example, with a pH of 4 to 12, preferably 5 to 11, especially 6.5 to 9.0, is introduced into at least one reactor which contains the supported precious metal catalyst, and is treated with hydrogen at 0° to 100° C., preferably 5° to 40° C., especially 10° to 25° C., and 1 to 10 bar.

It is also an aspect of the invention to introduce water, which contains chlorate or bromate ions without having been subjected to oxidative pretreatment, directly to the catalytic reduction.

Thus it is possible, for example, to treat by this process waste water with a pH of 3 to 14 and a bromate concentration of, for example, 4 g/l at temperatures of 5° to 90° C. and a hydrogen pressure of 1 to 10 bar. In this case bromate conversions of over 90% can be achieved.

If desired, the water can pass successively through several cascade-like reaction units in series, each containing a gassing system and a reactor. In this case the pH of the water can be readjusted if desired when passing from one reaction unit into the next-following reaction unit. In a different embodiment of the method a water whose content of substances to be removed by the method of the invention has not been completely removed by a first passage through the gassing apparatus and reactor can be returned again into the reaction circuit.

For the method of the invention, metal catalysts are used which are formed of a porous support material impregnated with the metal component. Palladium and/or rhodium is/are used as metal components. It is likewise an aspect of the invention to use palladium, or also rhodium, in combination with a metal of the copper group. Copper and silver especially are suitable as metals of the copper group. Copper is preferably used.

The proportion of the metal components in the entire catalyst can be between 0.1 and 10 wt.-%, preferably between 0.1 and 5, especially between 0.2 and 2.0 wt.-%.

A palladium content of 0.1 to 2.0 wt.-%, especially 0.1 to 1.0 wt.-%, of the total weight of the catalyst has proved advantageous.

In a preferred variant a combination of palladium with copper is used as the metal component. The weight ratio of palladium to copper can lie be between 1:1 and 8:1, especially 1:1 and 4:1.

In one embodiment of the invention catalysts can be used whose supports consist either of porous material which has a bimodal pore radius distribution amounting to at least 20% proportion of macropores with a minimum radius of 2,000Å, based on the total pore volume, or supports which exhibit a nonuniform distribution of the metal with a concentration in the surface region with a layer thickness of 20 to 100 µm, depending on the particle diameter, especially at a particle diameter of 50 to 1,000 µm, or those which exist in the form of a powder with a particle diameter smaller than 50 µm.

Materials are suitable as porous support materials with a bimodal pore radius distribution which have one maximum of the pore radius distribution in the small pore range with a radius up to about 400Å, for example between about 50 and 350Å, and a second maximum of the pore radius distribution in the macropore range with a radius of at least about 2,000Å. A support material with one pore radius distribution maximum in the small pore range with a radius of 50 to 300Å, especially 50 to 200Å, has proved desirable. For the macropore range, pore radii ranging from about 5,000 to about 20,000Å are desirable. The macropore content of the bimodal support materials should be sufficiently high to assure rapid diffusion and can vary depending upon the nature and size of the support particles. Bimodal support materials with a macropore content between 20 and 80%, preferably 40 and 60%, especially 40 and 50% of the total port volume, for example, have proven useful. In the case of particles with a uniform pore distribution, most of the pores should have a radius of 30 to 100Å. The same applies in principle to powder particles.

In the practice of the method the reacting agents should be rapidly removed from the active area.

A quick diffusion of the reacting agents from the catalytically active areas of the catalyst can also be promoted by using catalysts in which there is a non-uniform distribution of the metal on the support with a concentration in the surface region. A non-uniform metal distribution proves to be desirable in which the metal is concentrated at the surface with a depth of penetration between 20 and 100 Åm.

A rapid diffusion of the reacting agents from the catalyst can also be achieved by the use of catalysts in powder form, for example catalyst powders whose particles have a particle diameter of less than 50 Åm, especially less than 20 Åm.

The BET surfaces of support materials, i.e. of the catalysts with the structures described above, can vary in the range of about 20 to 360, in particular 60 to 300 m$^2$/g. For support materials with a bimodal pore distribution the BET surfaces are typically in the range from 20–30 up to 200 m$^2$/g, and in catalysts in powder form or catalysts with a uniform metal distribution they lie in the range from 50 to 200 m$^2$/g.

Support materials can also be used whose porosities differ decidedly from those described previously. Thus it has been found that, for example, the application of a porous oxidic coating on a core that is virtually nonporous, such as magnesium alumosilicate, results in a suitable support material. It has also been found that magnesium alumosilicate without this porous coating is likewise suitable.

These support materials naturally have a BET surface in the range from less than 1 up to 30 m$^2$/g.

Support particles of many different shapes can be used. The supports can be used in the shape, for example, of powders, granules, spheres, pearls, cylinders, hollow cylinders or hollow spheres.

For fluidized bed applications, even smaller-size particles are suitable, e.g., catalysts in powder form.

Support materials with a bimodal pore radius distribution can be prepared in a known manner. For example, for the preparation of porous ceramic materials with a bimodal pore radius distribution, substances can be added to the carrier material during its preparation, which can be washed or burned out again during the process, thus leading to the formation of macropores. The so-called "burn-out" substances can be combustible organic substances such as wood flour, starch, saccharose or an ammonium salt of an organic acid such as ammonium acetate, or also carbon black, which burn out of the material during the subsequent firing of the support particles, leaving macropores behind. This method is especially well suited to the preparation of bimodal aluminum oxide supports. For example, spherical aluminum oxide supports can be obtained by the method described in published German Application Nos. 25 04 463 and 25 46 318, by mixing an aluminum oxide hydrosol with a base such as hexamethylenetetramine which can be hydrolyzed with the use of heat, and admixing combustible, water-insoluble substances or carbon black, and also adding alumina and/or hydrated alumina, then dripping or spraying the mixture into a liquid that is not miscible with water at elevated temperature, for example temperatures between 60° and 100° C., letting the gel particles that form stand at the precipitation temperature, and then calcining.

A bimodal pore radius distribution can also be obtained in a known manner by subsequent controlled tempering of the support materials at temperatures ranging from about 600° to about 1,000° C. This method is especially suitable for pore expansion in SiO$_2$ supports. Thus, SiO$_2$ support materials with pore radii between 50 and 350Å can be converted to bimodal supports by subsequent tempering. For example, a 20% content of macropores in the range from 5,000 to 50,000Å can be produced in SiO$_2$ beads with a pore radius of 215Å by a 5-hour heat treatment at 700° C. followed by one hour of tempering at 800° C.

The impregnation of the support particles with the metal component can be performed by methods commonly used for the preparation of catalysts. For example, metal salts or complex metal compounds can be applied onto the support material by immersion, spraying or precipitation, and reduced in a known manner after drying and subsequent calcination. For example, the support particles can be immersed in or sprayed with a solution or suspension of metal salts or complex metal compounds in water or in an organic solvent, as for example a lower alcohol such as ethanol, or a ketone or mixtures thereof, then after drying, optionally calcined at temperatures up to 600° C., for example between 500° and 600° C., and then reduced with a metal-free reducing agent, preferably hydrogen or, if desired, with heat treatment at temperatures ranging up to 550° C., for example between about 200° and 550° C., or in aqueous phase with sodium borohydride or sodium formate at temperatures between 10° and 50° C.

The distribution of metal on the support material can be varied by the method employed for impregnation, in a manner known in itself. Thus for example when the support material is impregnated by immersion in a solution of a soluble metal compound, the depth of penetration of the metal into the support material can be controlled by varying the immersion time, e.g., between 1 and 30 minutes, and by varying the solvent, such as water or a more quickly evaporating organic solvent such as a lower alcohol such as ethanol or mixtures thereof, or by varying the nature of the metal compound with which the impregnation is to be done, or by varying the pH.

The depth of penetration of the metal thus depends on the time, the pH and the metal compound. Short immersion times cause the metal to be distributed mainly only in the surface layer of the support material. An extensive concentration of the metal in the surface of the support metal can also be achieved by the precipitation method, by spraying on a solution or suspension of the metal compound, or by coating the support material with a liquid containing the metal compound. In the case of catalysts with a non-uniform metal distribution with the metal concentrated in the surface—so-called "shell catalysts"—the course of the reaction is substantially more independent of diffusion effects than it is with catalysts having a uniform metal distribution.

In one embodiment the process is performed continuously for the purification of potable water. This preferred embodiment is characterized in that the water is fed continuously into a dosing vessel in which the pH is monitored and if necessary adjusted by addition of acid to a level not exceeding pH 12, preferably between pH 4 and pH 11, especially pH 6.5 and pH 9, and then passed by a variable-delivery pump regulating the rate of flow through one or more reactor units, each containing a gassing unit and a reactor, wherein the water first flows through the gassing unit and is gassed therein with hydrogen gas, under pressure if desired, and then is conducted through the reactor containing a catalyst bed with the metal catalyst; with the water running through as many reaction units as are necessary for the reduction of the substances that are to be removed in accordance with the invention.

The product water can be further processed in a known manner. The water is virtually free of oxygen, chlorine, and chlorine-oxygen and bromine-oxygen compounds. It can be used directly for those purposes in which oxygen-free water is required, e.g., as brewery water. If desirred, in potable water purification systems, it can also be aerated to reabsorb oxygen, in which case any slight residues of gases still dissolved in it can be removed.

In the treatment of water with high concentrations of halogen-oxygen compounds in a three-phase reactor, prior pH adjustment is not necessary.

The following examples are intended to explain, but not limit, the invention.

EXAMPLE 1

360 ml of water containing 2 mg/l of $BrO_3^-$ ions were placed in a stirring reactor. In the stirring reactor there were 5 g of palladium catalyst (Pd content 1%). After a time of stay of 12 minutes with a hydrogen input of 1 l/h no more bromate could be detected. Furthermore, an amount of 1.2 mg/l of bromide ions formed as reaction product.

EXAMPLE 2

The reaction conditions were analogous to Example 1:

A Pd/Cu catalyst (1% Pd, 0.25% Cu) was used. The water to be treated contained 2 mg/l of $BrO_3^-$ ions. After a residence time of 12 minutes no more bromate could be detected. 1.25 mg/l of bromide ions were formed as a reaction product.

EXAMPLE 3

The reaction of the bromate was performed on a fluidized bed catalyst. 100 g of a Pd—Cu supported catalyst was used (1 wt.-% Pd, 0.25 wt.-% Cu).

Water with a $BrO_3^-$ ion content of 0.5 mg/l and a pH of 6.3 was passed through the fluidized bed at a rate of 11 l/h and at 5 bar. 20 ml/l of hydrogen gas was dissolved in the water. In the discharged water the $BrO_3^-$ ion concentration averaged less than 0.01 mg/l; the Br ion concentration was determined to be 0.3 to 0.32 mg/l.

EXAMPLE 4

360 ml of water that contained 5 mg/l of $ClO_3^-$ was placed in a stirring reactor. 5 g of palladium catalyst (1% Pd content) was contained in the reactor. After a residence time of 15 minutes with a hydrogen input of 1 l/h, the $ClO_3^-$ ion concentration had fallen to a level below 0.1 mg/l. Furthermore, an amount of 2.1 mg/l of chloride ions had formed.

EXAMPLES 5–8

In a fluidized bed reactor both fully deionized water (FD water) and tap water were treated in the presence of hydrogen in a fluidized bed containing supported Alugel catalysts haivng various palladium contents.

The following operating conditions were established:

| | |
|---|---|
| Rate of flow of water | 7 l/h |
| Hydrogen input | 0.3 l/h (at 20° C., 1 bar) |
| Water temperature | 10° C. |
| pH | 7 |
| Pressure: | 5.8 bar (absolute) |

The bromate reduction achieved is shown in Table 1.

The analysis values for bromide include a detection limit of 20 µg/l and a standard deviation of ±20 µg/l, and for bromate a detection limit of 2 µg/l and a standard deviation of ±2 µg/l.

EXAMPLE 9

300 ml of water containing 972 mg/l of chlorate ions was placed in s stirring reactor. In the reactor were 5 grams of a supported Pd/Cu catalyst (0.23% Pd, 0.28% Cu on aluminum oxide). Two liters of hydrogen were fed in per hour. At a reaction temperature of 90° C., after a reaction time of 3 hours, only 35 mg/l of chlorate ions were detected, but 406 mg/l of chloride ions.

EXAMPLE 10

In a sprinkled bed reactor (three-phase solid bed reactor) there were 1021.6 g of a palladium catalyst (0.89% Pd on $ZrO_2$/cordierite (magnesium aluminum silicate). Passed through this reactor, in addition to the hydrogen, was a continuous stream of 3.7 l/h of a heavily contaminated waste water (pH 11.7) with a bromate ion concentration of 3000 mg/l. The reaction temperature was 60° C.; a pressure of 4 bar was measured in the reactor. In the discharge, the measured bromate concentration was less than 50 mg/l, i.e., a catalytic decomposition of bromate of over 98% had been achieved.

TABLE 1

| | Catalyst | | | | | | | |
|---|---|---|---|---|---|---|---|---|
| Example No. | Pd content [%] | Amount of catalyst [g] | Water Type | Time [d] | $BrO_3$ [µg/l] In | Out | Br [µg/l] In | Out |
| 5 | 0.5 | 30 | Deionized Water | 1 | 80 | 1 | 10 | 50 |
|   |     |    |                 | 5 | 74 | 1 | 10 | 50 |
| 6 | 1.0 | 30 | Deionized Water | 1 | 110 | 1 | 10 | 79 |
|   |     |    |                 | 4 | 99  | 1 | 10 | 41 |
| 7 | 1.0 | 70 | Deionized Water | 1 | 105 | 1 | 10 | 33 |
|   |     |    |                 | 5 | 118 | 1 | 10 | 60 |
|   |     |    |                 | 10 | 189 | 1 | 10 | 24 |
|   |     |    |                 | 16 | 65 | 1 | 10 | 40 |
| 8 | 1.0 | 70 | Tap water | 6 | 80 | 1 | 65 | 110 |
|   |     |    |           | 10 | 65 | 5.7 | 70 | 100 |
|   |     |    |           | 17 | 73 | 5.3 | 60 | 70 |
|   |     |    |           | 19 | 25 | 6.9 | 70 | 75 |

We claim:

1. A method of treating water containing at least one halogen-oxygen compound selected from the group consisting of chlorate and bromate compounds, said method comprising contacting the water with a supported precious metal catalyst in the presence of hydrogen and catalytically reducing said at least one compound, wherein said supported precious metal catalyst comprises at least one metal selected from the 8th subgroup of the Periodic Table of Elements.

2. A method according to claim 1, wherein said at least one metal is palladium.

3. A method according to claim 1, said catalyst comprises a mixture of said at least one precious metal and a metal of the copper group.

4. A method according to claim 3, wherein said at least one precious metal is palladium, and said metal of the copper group is selected from copper and silver.

5. A method according to claim 3, wherein said metal of the copper group comprises copper.

6. A method according to claim 1, wherein said precious metal catalyst is supported on an inorganic oxide support.

7. A method according to claim 6, wherein said inorganic oxide support comprises at least one oxide selected from $Al_2O_3$, $SiO_2$, $ZrO_2$, MgO and $TiO_2$.

8. A method according to claim 6, wherein said support comprises γ-aluminum oxide.

9. A method according to claim 1, wherein said catalyst is supported on a support comprising aluminosilicate, magnesium aluminosilicate or active carbon.

10. A method according to claim 9, wherein the support comprises $ZrO_2$ and magnesium aluminosilicate.

11. A method according to claim 9, wherein the support material comprises magnesium aluminosilicate.

12. A method according to claim 1, wherein said catalyst comprises from 0.1 to 10 wt % of said precious metal.

13. A method according to claim 12, wherein said catalyst comprises from 0.1 to 5 wt % palladium.

14. A method according to claim 13, wherein said catalyst comprises from 0.2 to 2 wt % palladium.

15. A method according to claim 1, wherein said catalyst comprises a support impregnated with palladium and copper.

16. A method according to claim 1, wherein the catalytic treatment is carried out in at least one flowing bed, fixed bed or fluidized bed reactor.

17. A method according to claim 1, wherein the catalytic treatment is carried out in a two-phase or three-phase reactor.

18. A method according to claim 1, wherein hydrogen is introduced into the water by a method selected from the group consisting of:

i) direct introduction;

ii) introduction by means of a saturation system; and iii) introduction through a membrane.

19. A method according to claim 1, wherein hydrogen is introduced into the water simultaneously with the contact between the water and the supported catalyst.

20. A method according to claim 1, wherein hydrogen is introduced into the water prior to contact between the water and the supported catalyst.

21. A method according to claim 1, wherein the water is contacted with the catalyst at a temperature in the range from 0° to 100° C. and at a pressure in the range from 1 to 10 bar.

* * * * *